Figure 1:
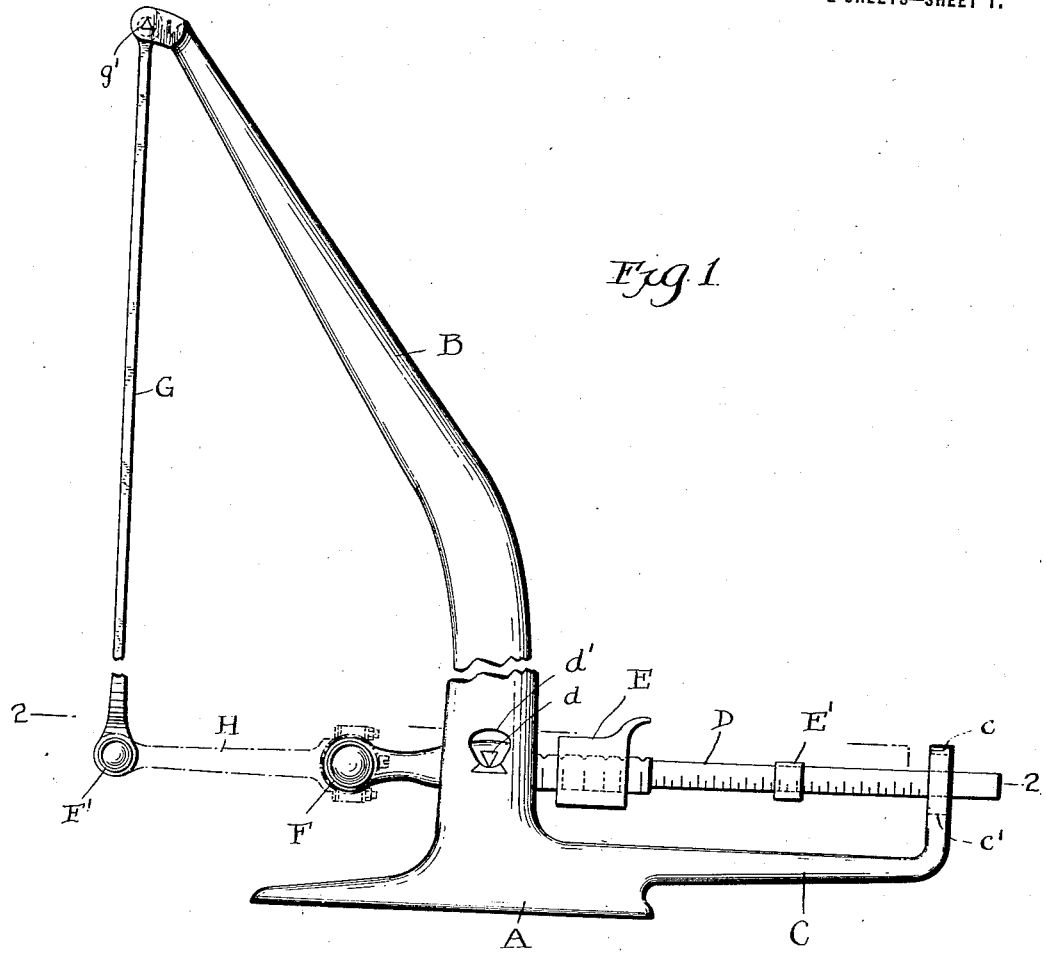

G. P. HENRY.
MACHINE FOR WEIGHING AND BALANCING CONNECTING RODS OF ENGINES.
APPLICATION FILED MAR. 3, 1916.

1,200,494.

Patented Oct. 10, 1916.

WITNESSES:

INVENTOR
Guy P. Henry
BY
his ATTORNEY

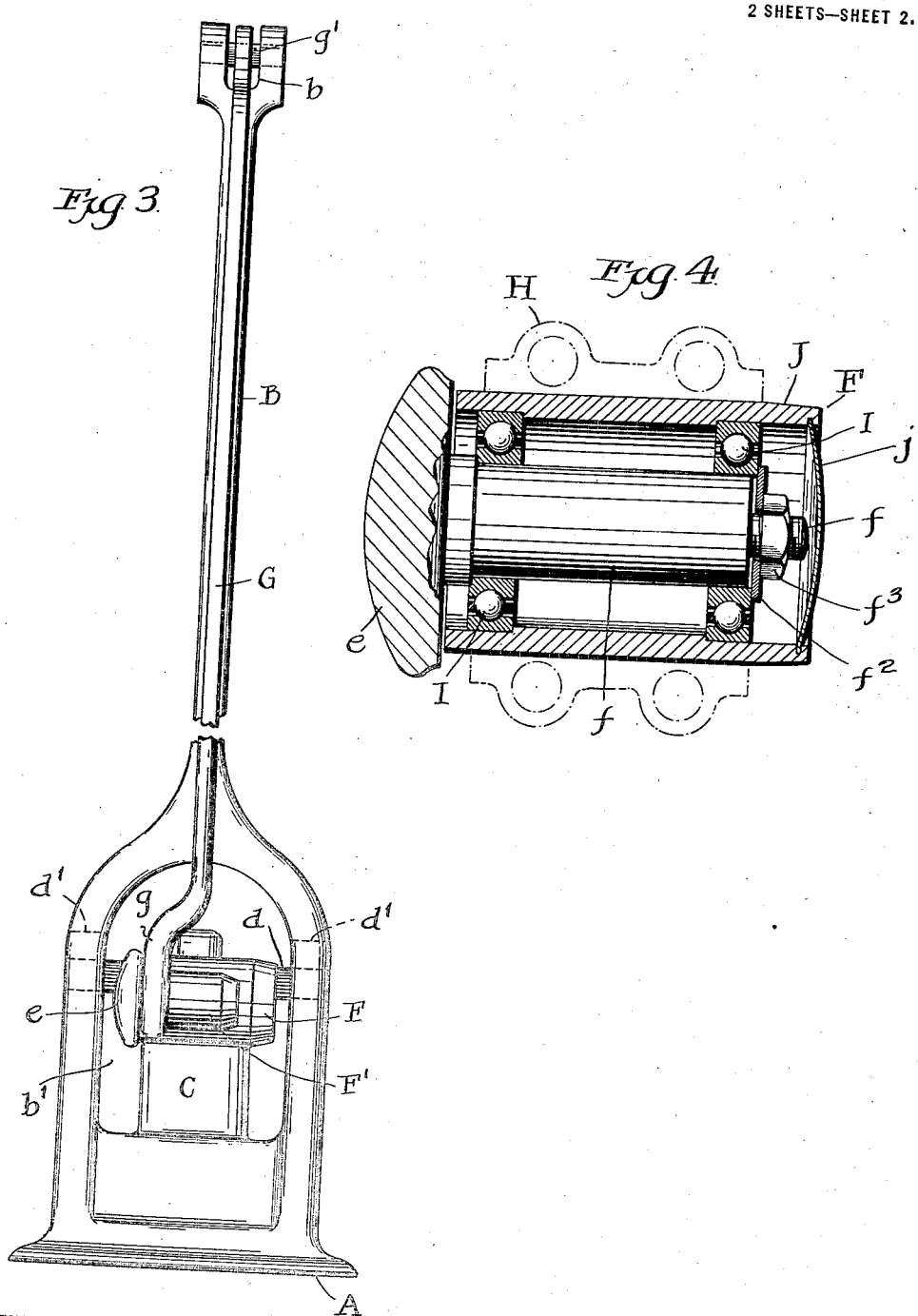

UNITED STATES PATENT OFFICE.

GUY P. HENRY, OF DETROIT, MICHIGAN, ASSIGNOR TO THE STUDEBAKER CORPORATION, A CORPORATION OF NEW JERSEY.

MACHINE FOR WEIGHING AND BALANCING CONNECTING-RODS OF ENGINES.

1,200,494. Specification of Letters Patent. Patented Oct. 10, 1916.

Application filed March 3, 1916. Serial No. 81,813.

*To all whom it may concern:*

Be it known that I, GUY P. HENRY, a citizen of the United States of America, and resident of Detroit, in the county of Wayne and State of Michigan, have invented certain new and useful Improvements in Machines for Weighing and Balancing Connecting-Rods of Engines, of which the following is a specification.

This invention relates to machines for weighing and balancing connecting rods of engines.

One method of balancing connecting rods is to weigh each complete rod against a standard connecting rod and separate to the nearest ounce within the limit of eight ounces, four above and four below standard. The big ends of these rods are then weighed against a standard big end and separated, as to under-weight and over-weight, to the same limits as above, and again grouped in sets of four accordingly. By this method, a consignment of rods may be divided into as many as sixty-four groups, and this number of groups has been found sufficient in most cases to cover average variation in weight of the rods. It will be readily seen, from the foregoing, that a considerable amount of time must be expended in weighing the rods to determine to which group they belong.

It has been the practice to weigh connecting rods on weighing machines, which machines, as heretofore employed, have been of such construction that considerable time is wasted in inserting and removing the rods from the machines. This is largely due to the fact that, in practically all cases, it has been necessary either to dismantle a portion of the machine to insert the rod into proper position, or to provide means which is adapted to be secured to the rod before insertion into the machine, and removed therefrom after the weighing operation is completed, said means being so formed as to coöperate with a portion of the machine to maintain the rod in proper position therein during the weighing operation.

With the foregoing in mind, the object of the present invention is to provide a weighing machine which will carry out its rod-weighing function without necessitating dismantling of the machine or application of removable adjuncts.

In other words, the object of the invention is to provide means forming a part of the weighing machine, which means is adapted to detachably receive a rod when positioned in place, thereby entirely obviating all loss of time in making connections or in disconnecting devices, and leaving the parts, at all times, in position to receive a subsequent rod or to allow of the removal of one already in place.

Features of the invention, other than those specified, will be apparent from the hereinafter detailed description taken in conjunction with the accompanying drawings.

In the accompanying drawings, I have illustrated one practical embodiment of the invention, but the construction shown therein is to be understood as illustrative, only, and not as defining the limits of the invention.

Figure 2:
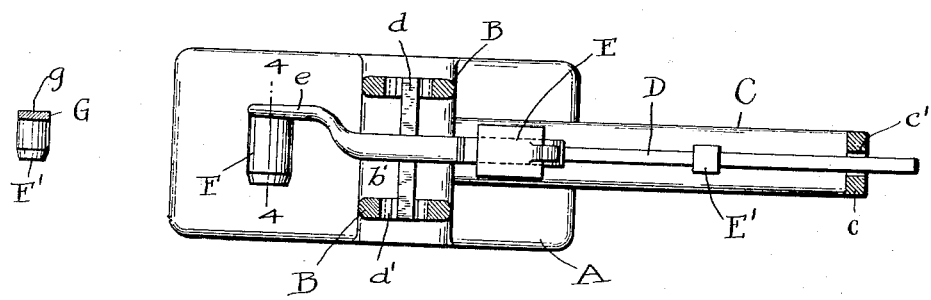

Figure 1 is a front elevation of a machine embodying the present invention. Fig. 2 is a horizontal section taken on line 2—2 of Fig. 1. Fig. 3 is an end elevation of the machine shown in Fig. 1, the parts in Fig. 3 being shown on a somewhat larger scale, and Fig. 4 is an enlarged sectional detail taken in the plane of line 4—4 of Fig. 2.

Referring to the drawings, A designates the supporting base of the machine. Rising above base A, and extending laterally to a point above and beyond one end of the base, is an arm B, the upper end of which is bifurcated at $b$. A second arm C extends from base A in a substantially horizontal and lateral direction, opposite to the lateral direction of extension of arm B. Near its free end, arm C is turned up at $c$, and is slotted at $c'$. Extending longitudinally of the base is a scale or balance rod D, one end of which rod passes through slot $c'$ of arm C, the other end passing through an opening $b'$ near the base of arm B. Scale or balance rod D is fulcrumed to arm B by means of knife-edged members $d$, which extend from opposite sides of the rod and in alinement with one another. Knife-edged members $d$ pass through oppositely positioned apertures $d'$ in arm B and rest upon the base of said apertures, as shown most clearly in Fig. 1.

One arm of rod D is provided with a pair of coöperating sliding weights E E', whereby the weighing operation of an article suspended at the extremity of the other arm may be carried on, and near its end said other arm is offset laterally, as at $e$. At the extremity of the offset portion is a forwardly extending member F, over which is adapted to be slipped the large end of the connecting rod to be weighed. A similar member F', adapted to engage the small end of the connecting rod, is supported, in spaced relation to member F, on an offset portion $g$ of a link G which is suspended from the bifurcated free end of arm B. The connection between link G and arm B may be of any suitable character, but, as herein shown, the upper end of link G is provided with an eye through which passes a knife-edged member $g'$ secured at its opposite ends in the bifurcated portion of arm B. Suspension link G is, therefore, adapted for free pivotal movement.

As is, of course, well understood, connecting rods are provided at their opposite ends with parallel bores or bushings, through which are adapted to extend the wrist-pins or shafts with which the connecting rod coöperates when in position within a machine or engine. As stated, members F F' extend forwardly in parallel relation, and are, therefore, adapted to simultaneously enter the bores of such a rod when said rod is brought into proper position. This is the essence of this invention. By the construction described, all that it is necessary to do to secure a rod within the machine is simply to bring the rod into a position wherein members F F' are in alinement with the oppositely positioned bores of the rod, whereupon sidewise movement of the rod will cause said members to pass through the bores and thereby maintain the rod suspended within the machine. No dismountable adjuncts are necessary to position the rod in place or maintain it so, since members F F' are fixed to their respective rods so that they cannot get out of parallel relation. Moreover, as described, both scale rod D and suspension link G are offset so that the line of direction of weight of the connecting rod will lie in a plane passing through the medial lines of both suspension link G and scale rod D. There will, accordingly, be no racking or torsional strains during the weighing operation.

In carrying out the weighing operation, a connecting rod H is inserted in the machine as shown in the dot-and-dash lines in Fig. 1, so that the bore of the large end of the connecting rod will embrace member F of scale rod D, while the bore at the small end of the rod will embrace member F' of suspension link G. When this positioning of the rod in place has been accomplished, the weights E and E' are shifted as necessary to balance rod D upon its fulcrum $d$. The positions of weights E E' relative to a printed scale on rod D determine the weight of the large end of the connecting rod.

Members F and F' may be of any suitable construction, but, in the preferred form of the invention, embody anti-friction means. The preferred construction is shown in Fig. 4, it being understood that both members F F' are of the same construction but of slightly different size, corresponding to the sizes of the bores of the connecting rods to be weighed.

Referring to Fig. 4, $e$ designates the offset end of scale rod D, which is provided with a forwardly extending post $f$, reduced at its free end and threaded at $f'$ to receive a washer $f^2$ and a nut $f^3$. Positioned coaxially with post $f$, and enveloping the same, is a sleeve J, and between the interior of sleeve J and the exterior of post $f$ are interposed anti-friction bearings I. The parts are locked against relative displacement by means of the nut and washer $f^3$ and $f^2$, respectively. The exterior diameter of sleeve J is of a size substantially equal to, or a trifle less than, the bore of the connecting rod with which it coöperates, and said sleeve is preferably made somewhat longer than the thickness of the rod, a portion of the sleeve adjacent the end thereof being tapered slightly so that said sleeve may more readily enter the bore of the rod. The end of sleeve J is preferably closed by a suitable cap or diaphragm $j$, to preclude the entrance of dust and dirt into the interior thereof.

When both rod D and link G are provided with anti-friction means of the character described, there will be absolutely no binding between the parts during the weighing operation, and said weighing will, therefore be accurate.

The machine of this invention is very efficient in the carrying out of its function, in allowing of very rapid and accurate balancing of the connecting rods. Suspension link G is, preferably, made extra long in order to reduce friction to a minimum and to allow of the weighing of rods of slightly varying lengths in an accurate manner, without necessitating manual adjustments of the machine. In weighing connecting rods on a machine of the character described, the insertion of a rod in the machine and its removal therefrom can be accomplished with great celerity, so that the loss of time heretofore necessary in the carrying out of these operations is entirely obviated in this machine. The efficiency of weighing machines is, therefore, by this invention, increased to the maximum by a marked simplification in weighing machine construction and mode of operation.

Having thus fully described the invention, what I claim as new, and desire to secure by Letters Patent, is:

1. In a connecting rod weighing machine, the combination of weighing means, with two complementary supporting members one of which is connected to the weighing means and both of which are permanently positioned in parallel relation and adapted to receive and detachably support a connecting rod in position to be weighed, each of said members being supported in substantially horizontal position from one of its ends to leave its other end unobstructed, whereby a connecting rod is freely slidable on to said members into weighing position and removable from said members in like manner, said members being, at all times, in parallel relation, and in weighing positions, in the machine.

2. In a connecting rod weighing machine, the combination of weighing means, with two parallel supports, each of which is permanently secured at one of its ends to the machine, one being connected to the weighing means, and both of which project horizontally in the same direction, the free ends of the supports being unobstructed and adapted to simultaneously enter the bores of a connecting rod, when said rod is brought into weighing position, for the purpose of detachably supporting the rod during the weighing operation, said rod being subsequently removable from the supports without disturbing their parallel relation or their positions in the machine.

3. A connecting rod weighing machine embodying weight determining mechanism for supporting one end of a rod, a support for the other end of the rod, and complementary members, one of which is permanently mounted on the weight determining mechanism while the other is permanently mounted on the support, said members being mounted in parallel relation, and substantially horizontal, whereby they are adapted, while in their permanent positions, to receive the bores of the connecting rods for the purpose of detachably supporting the same within the machine.

4. In a connecting rod weighing machine, the combination of weighing means with two complementary supporting members one of which is connected with the weighing means and both of which are permanently positioned in parallel relation and adapted to receive and detachably support a connecting rod in position to be weighed, each of said members being supported in substantially horizontal position from one of its ends to leave its other end unobstructed, whereby a connecting rod is freely slidable on to said members into weighing position and removable from said members in like manner, said members being at all times in parallel relation and weighing positions in the machine, and antifriction means embodied in said supporting member to obviate friction during the weighing operation.

5. A connecting rod weighing machine embodying weight determining mechanism adapted to support one end of a rod, a support for the other end of the rod, and complementary members, one of which is permanently fixed on the weight determining mechanism and the other mounted in like manner on the support, said members being mounted in parallel relation substantially horizontal whereby they are adapted while in their permanent position to enter the bores of the connecting rods for the purpose of detachably supporting the same within the machine.

6. A connecting rod weighing machine embodying a scale bar, means for balancing said bar when one end of a rod is supported on one end of the bar, a support for the other end of the rod, and substantially horizontal complementary members, one of which is permanently mounted on the scale bar and the other mounted in a similar manner on the support, said members being mounted in parallel relation, whereby a connecting rod is freely slidable onto said members into weighing position and removable from said members in like manner, said members being retained in parallel, operative, weighing positions at all times.

7. A connecting rod weighing machine embodying weight determining mechanism adapted to support one end of a rod, a pivoted support for the other end of the rod, and a pair of substantially horizontal complementary members, one of which is permanently secured to the weight determining mechanism and the other of which is permanently secured to the pivoted support, said members being in parallel relation whereby they are adapted to enter the bores of a rod to support the same during the weighing operation.

8. A connecting rod weighing machine embodying weight determining mechanism adapted to support one end of a rod, a pivoted suspension link for supporting the other end of the rod, and a pair of substantially horizontal complementary members, one of which is permanently secured to the weight determining mechanism and the other of which is permanently secured to the suspension link, said members being in parallel relation, whereby a connecting rod is freely slidable onto said members into weighing position and removable from said members in like manner, said members being retained in parallel, operative, weighing positions at all times.

9. In a connecting rod weighing machine, the combination of a base provided with an upwardly and laterally extending arm, a scale bar pivotally supported on said arm and provided at one end with a projection adapted to receive the bore at one end of a connecting rod, and a link pivotally secured at one end to the free end of said upstanding arm and provided at its other end with a projection parallel to the projection on the scale bar, the projection of the link being adapted to receive the bore at the other end of the connecting rod, said projections serving conjointly to support and maintain said rod during the weighing operation.

10. In a connecting rod weighing machine, the combination of a base member provided with an upwardly and laterally extending arm, a pivoted link depending from the end of said arm, a scale bar pivotally mounted intermediate its ends on said arm, and parallel projections, one of which is positioned at the free end of the link and the other of which is mounted on the adjacent end of the scale bar whereby said projections are adapted to receive the bores of a connecting rod to support the same during the weighing operation.

11. In a connecting rod weighing machine, the combination of a base, weighing mechanism mounted thereon, a link suspended from a portion of said base, and substantially horizontal complementary supporting members, one of which is permanently secured to the link and the other of which is permanently secured, in parallel relation to the other, to the weighing mechanism, whereby a connecting rod is freely slidable onto said members into weighing position and removable from said members in like manner, said members being, at all times, in parallel relation, and in weighing positions, in the machine.

Signed by me at Detroit, Michigan, this 1st day of March 1916.

GUY P. HENRY.

Witnesses:
R. E. SCRATCH,
ROY C. GAMBLE.